(12) United States Patent
Suh et al.

(10) Patent No.: US 7,558,447 B2
(45) Date of Patent: Jul. 7, 2009

(54) SINGLE-POLE OPTICAL WAVELENGTH SELECTOR

(75) Inventors: SeongWoo Suh, Mount Olive, NJ (US); Yossi Corem, Beit Shemesh (IL)

(73) Assignee: Xtellus Inc., Morris Plains, NJ (US)

( * ) Notice: Subject to any disclaimer, the term of this patent is extended or adjusted under 35 U.S.C. 154(b) by 0 days.

(21) Appl. No.: 10/580,832

(22) PCT Filed: Nov. 26, 2003

(86) PCT No.: PCT/IL03/01002

§ 371 (c)(1),
(2), (4) Date: Jun. 22, 2007

(87) PCT Pub. No.: WO2005/052507

PCT Pub. Date: Jun. 9, 2005

(65) Prior Publication Data

US 2007/0279738 A1    Dec. 6, 2007

(51) Int. Cl.
G02B 6/26 (2006.01)
(52) U.S. Cl. .............................. 385/16; 385/15; 385/18
(58) Field of Classification Search .................. 385/15, 385/16, 18
See application file for complete search history.

(56) References Cited

U.S. PATENT DOCUMENTS

| | | | |
|---|---|---|---|
| 4,558,952 A | 12/1985 | Kulesh et al. | |
| 4,959,665 A | 9/1990 | Saito et al. | |
| 6,513,953 B1 * | 2/2003 | Itoh | ........................... 362/331 |
| 6,563,974 B2 | 5/2003 | Agha Riza | |
| 6,678,430 B1 | 1/2004 | Noe et al. | |
| 6,867,868 B1 | 3/2005 | Barbarossa | |
| 7,357,510 B2 * | 4/2008 | Kim et al. | ....................... 353/7 |
| 7,454,100 B2 * | 11/2008 | Corem et al. | .................. 385/18 |

FOREIGN PATENT DOCUMENTS

| | | |
|---|---|---|
| WO | WO-2003/032071 | 4/2003 |
| WO | WO-2005/052507 | 6/2005 |

* cited by examiner

*Primary Examiner*—Jennifer Doan
(74) *Attorney, Agent, or Firm*—Morrison & Foerster LLP

(57) ABSTRACT

A single-pole, wavelength selective switch in which the input optical signal is converted to a light beam having a defined polarization, such as S-polarization, with respect to the system plane. The beam is laterally expanded in the system plane, and then spatially dispersed in the same plane as that of the beam expansion, preferably by means of a diffraction grating. The light is directed through a polarization conversion device, preferably a liquid crystal cell, pixelated along the wavelength dispersive direction such that each pixel operates on a separate wavelength. When the appropriate control voltage is applied to a pixel, the polarization of the light signal passing through that pixel is rotated, such as from S to P. The wavelength dispersed beams from the pixels are recombined, and are passed towards another polarizer at the switch output, aligned such that only the selected polarization components are allowed to exit.

24 Claims, 6 Drawing Sheets

SINGLE-POLE OPTICAL WAVELENGTH SELECTOR

FIELD OF THE INVENTION

The present invention relates to the field of fast optical switches, whose operation can be made wavelength dependent, especially for use as a channel blocker in an optical communication system.

BACKGROUND OF THE INVENTION

It is known in the field of optical communications to use optical wavelengths as optical carriers for carrying digital or analog information. Also, the different wavelengths may be used to discriminate one set or channel of information from another. When a plurality of wavelengths are coupled or multiplexed onto a single fiber, this is called wavelength division multiplexing (WDM). Use of such WDM increases the overall bandwidth of the system. For example, a single fiber carrying two wavelengths has twice the bandwidth of a fiber carrying a single wavelength. Generally, a large number of channels would be carried on one fiber. The closer the channel spacing, the greater the number of channels that may be transmitted over the fiber. Recently the International Telecommunications Union has proposed a Dense WDM ("DWDM") network standard with optical signal channels having a frequency separation of 100 GHz (equivalent to a wavelength separation of about 0.8 nm), in order to ensure high utilization of the available optical bandwidth, and even denser standards are envisaged. The performance requirements for a DWDM network (such as those for bandwidth, cross talk, polarization dependent loss, polarization mode dispersion, insertion loss) are becoming more stringent. Additionally, it is anticipated that future efforts to increase capacity by reducing optical channel spacing will require additional improvements in optical system components In co-pending PCT Application No. PCT IL02/00511, hereby incorporated by reference in its entirety, there is disclosed a wavelength selective switch wherein an input optical signal is spatially wavelength-dispersed and polarization-split in two preferably perpendicular planes. The wavelength dispersion is preferably performed by a diffraction grating, and the polarization-splitting by a polarizing beam splitter. A polarization rotation device, such as a liquid crystal polarization modulator, pixelated along the wavelength dispersive direction such that each pixel operates on a separate wavelength channel, is operative to rotate the polarization of the light signal passing through each pixel, according to the control voltage applied to the pixel. The polarization modulated signals are then wavelength-recombined and polarization-recombined by means of similar dispersion and polarization combining components as were used to respectively disperse and split the input signals. At the output polarization recombiner, the direction in which the resulting output signal is directed is determined by whether the polarization of the particular wavelength channel was rotated by the polarization modulator pixel, or not. A fast, wavelength selective, optical switch is thus provided, capable of use in WDM switching applications. Such a switch can also be provided in a 1×1 configuration, for use as a channel blocker. However, the use of two-channel input and output ports makes the switch unnecessarily complicated for such use. Furthermore, the resolution and insertion loss may be inferior to what could be achieved in a switch constructed from the outset for single pole, single channel switching.

There therefore exists a need for a fiber optical, single-pole, wavelength selective optical switch which can be manufactured inexpensively, while also being small in size for easy installation, reliable, have very low insertion loss, high wavelength resolution and stable performance over a variety of environmental conditions of the network.

The disclosures of each of the publications mentioned in this section and in other sections of the specification, are hereby incorporated by reference, each in its entirety.

SUMMARY OF THE INVENTION

The present invention seeks to provide a new fiber-optical, single-pole, wavelength selective switch structure, such as is used for channel blocking applications in optical communication and information transmission systems. The switch uses a minimum of components, and can thus be economically constructed for large scale use in such systems. The switch structure can also be used as a wavelength selective variable optical attenuator.

There is thus provided in accordance with a preferred embodiment of the present invention, a wavelength selective switch, wherein the input optical signal is first converted to light beam having a defined polarization with respect to the system plane in which optical manipulation of the beam is to be performed, this system plane of optical manipulation being described hereinbelow. This "defined polarization" can either preferably be a linear polarization having a generally defined direction, or alternatively and preferably, a circularly polarized beam having a defined direction of polarization rotation. The term "linear polarization" as used and as claimed in this specification, is understood to refer to a polarized beam of light which is intended to have a single linear polarization in the desired direction, even though it may still contain some polarization components in directions other than that desired. Similarly, the term "circularly polarized", as used and as claimed in this specification, is understood to refer to a polarized beam of light which is intended to have a circular polarization in the desired rotation direction, even though it may still contain some polarization components in directions which may cause it to be somewhat elliptic.

For preferred embodiments using a generally linear polarization, the polarization conversion is preferably performed by means of a birefringent crystal, such as $YVO_4$ with a half wave plate covering approximately one half of the output port. Such a component is commercially available from the JDSU-Casix Corp., of Fuzhou, China, by whom it is described as a C-polarizer, this name now being in common generic use in the art. For such an embodiment, the resulting generally linearly polarized output beam, defined as the S-polarization, is then laterally expanded in the system plane, i.e. in the plane parallel to the direction of S-polarization, preferably by means of a pair of anamorphic prisms, though any alternative method, such as a cylindrical lens telescope system, could also be utilized. The beam is then spatially wavelength-dispersed in the same plane as that of the beam expansion, preferably by means of a diffraction grating.

The light is directed through a polarization conversion device, preferably a liquid crystal cell, pixelated along the wavelength dispersive direction such that each pixel operates on a separate wavelength. When the appropriate control voltage is applied to a pixel, the polarization of the light signal passing through that pixel is rotated from S- to P-polarization. The wavelength dispersed beams from all of the pixels are then recombined, preferably by means of a similar grating to that which was used to disperse the input beams, and are passed towards the switch output. At this output, there is preferably disposed another C-polarizer, aligned in the same polarization direction as that of the input C-polarizer, such that only the S-polarization is allowed to exit and the P-polarization is blocked. A linear polarizer, aligned parallel to the S-polarization direction, can optionally be located before the output beam enters the C-polarizer, to increase the extinction ratio. The light of wavelengths which passed through pixels which did not rotate the polarization, is thus output from the switch attenuated only by the small insertion loss of the switch. Light, on the other hand, of wavelengths which passed through pixels which did rotate the polarization direction from S- to P-, is highly attenuated and generally blocked from exiting the switch because of the C-polarizer, aligned such that only the S-polarization is transmitted and the P-polarization blocked. Since each pixel is related to a specific wavelength, the resulting effect is that of a wavelength dependent, ON/OFF optical switch. Each channel is capable of being switched according to the switching rate of the liquid crystal cell pixels, and therefore suitable for use in WDM or DWDM switching applications.

For an embodiment using a circularly polarized beam of light, the circular polarization is preferably generated by inserting a quarter wave plate into the path of the initially generated linearly polarized beam, though any alternative method known in the art of producing a circularly polarized beam may also be used. The polarization conversion device, preferably a liquid crystal cell, is arranged to be such that when the appropriate control voltage is applied to a pixel, the symmetry of the polarization of the light passing through that pixel is reversed, such that, for instance, a clockwise or right handed polarization signal is converted to an anti-clockwise or left handed polarization signal, or vice versa. By this means, it becomes simple at the output of the switch, to block or to transmit light which has passed through a specific pixel, according to whether the output has symmetric polarization relative to the input signal or has been converted to anti-symmetric polarization by the liquid crystal cell. After passage through the liquid crystal cell, or equivalent, the circular polarization is preferably converted back into linear polarization at the output side of the switch, thus enabling simple blocking or transmission of the output beam by means of a linear polarizer and/or a C-polarizer. Light of wavelengths which passed through pixels which did not reverse the symmetry of the polarization, is thus output from the switch attenuated only by the small insertion loss of the switch. Light, on the other hand, of wavelengths which passed through pixels which did reverse the symmetry of the polarization to the antisymmetric mode, is highly attenuated and generally blocked from exiting the switch.

The mutual alignment directions of the various components of the switch play an important part in the efficiency of its operation. Thus, for the linear polarization preferred embodiments, the anamorphic prism pair is preferably aligned relative to the S-polarization of the incident beam such as to ensure an incident angle close to the Brewster angle. At this angle of incidence, the S-polarization component therefore transmits through the prism pair with optimum efficiency, resulting in a lower insertion loss. Similarly, the beam expansion in the plane perpendicular to the direction of the grating rulings ensures high wavelength resolution. Furthermore, the plane of the S-polarization of the incident beam perpendicular to the direction of the grating rulings ensures optimum grating efficiency.

The combination of the following three features, namely the use of resolution-advantageous beam expansion in the same plane as that of the grating dispersion plane, the use of polarization selection to provide optimum grating efficiency, and the use of polarization selection by means of the serial use of multiple polarization selection elements, results in a wavelength selective single pole switch with increased wavelength resolution and increased on/off attenuation ratio in comparison with previously available optical switches. Furthermore, the use of an anamorphic prism pair to laterally expand and compress the beams, rather than the use of alternative components which can be used to generate such one dimensional magnification, generally results in a lower insertion loss to the switch when in its transmissive state. Additionally, such a switch can be constructed more compactly and more economically than previously available switches performing a similar function.

In the above described embodiments, the S-polarization direction of the light traversing the system is parallel both to the plane of the beam expansion and to the plane of the beam dispersion. This embodiment provides the optimum optical transmission characteristics, and hence the lowest switch insertion loss. However, it is to be understood that the switch is also operative, according to other preferred embodiments, with the direction of the light polarization at angles other than parallel to the expansion and dispersion directions. The switch efficiency, however, is then generally lower. A basic feature relating to the orientation planes of the components of the present invention, is that the beam expansion direction is made to be parallel to the direction of the beam dispersion.

Furthermore, although in the above described embodiments, the alignment of the polarization selection components has been defined as being such that when a pixel of the polarization rotation device is switched, the light which passes therethrough is blocked from exiting the switch, and the light passing through an unswitched pixel is transmitted, this being termed a "Normally Open" switch in the art, it is to be understood that the present invention would operate equally effectively in the opposite mode, namely that the polarization rotation device be programmed and the polarization sensitive devices aligned, such that it is the light which passes through unswitched pixels which is blocked, and the light which passes through switched pixels which exits the switch, this being termed a "Normally Closed" switch in the art.

According to another preferred embodiment of the switch of the present invention, the use of a reflecting surface after the polarization rotator, operative to direct the polarization controlled light back down its incident path, enables the number of components in the switch to be substantially reduced, to almost half that of the first-mentioned transmissive embodiments.

The above depicted preferred embodiments of the present invention, have all been described in terms of a switch, which is designed either to essentially completely transmit all of the desired wavelength components of the incident light signal, or to essentially completely block transmission of desired wavelength components. According to further preferred embodiments of the present invention, the same switch structure can be arranged to operate as a wavelength dependent variable optical attenuator. In this embodiment, the signal applied to a pixel is arranged to be such as to rotate the polarization of the light passing through that pixel to a predetermined intermediate alignment, so as to vary the fractional component of light of polarization which is transmitted through the polarization analyzer at the output. Variation of the rotation of the polarization of the light passing through a pixel enables the level of light transmitted at the wavelength corresponding to that pixel to be varied between minimum and maximum transmission levels.

There is also provided in accordance with another preferred embodiment of the present invention, a wavelength selective optical switch comprising:

(a) a polarization transformation device receiving input light having a plurality of wavelength components and outputting light of a predefined polarization, (b) a beam expanding device for expanding the light of predefined polarization in a predetermined plane, (c) a first dispersive element receiving the expanded light of predefined polarization, and dispersing wavelength components of the expanded light of predefined polarization in the predetermined plane, (d) a polarization conversion element receiving the dispersed wavelength components of the expanded light of predefined polarization, the polarization conversion element being pixelated generally along the direction of the dispersion such that separate pixels are associated with separate wavelength components of the expanded light, and at least one pixel of the polarization conversion element being operative to convert the polarization of light passing through the pixel according to a control signal applied to the pixel, (e) a second dispersive element receiving light from the polarization conversion element, and operative to combine the separate wavelength components of the light into multi-wavelength output light, (f) a beam compressing device aligned such that the multi-wavelength output light is compressed in the predetermined plane, and (g) a polarization selective device receiving the compressed multi-wavelength output light, and aligned such that only those components of the multi-wavelength output light having a predetermined polarization are transmitted therethrough.

The above-mentioned predetermined polarization may preferably have a symmetric or an anti-symmetric polarization to that of the predefined polarization.

Furthermore, the predefined polarization may be either a generally circular polarization, or a generally linear polarization.

In accordance with yet another preferred embodiment of the present invention, the above-described wavelength selective optical switch also preferably comprises at least one of a first focussing element to focus the dispersed wavelength components of the expanded light of predefined polarization onto the polarization conversion element, and a second focussing element to collect the dispersed wavelength components of the light after passage through the polarization conversion element. Alternatively and preferably, the first dispersive element may be operative to focus the dispersed wavelength components of the expanded light of predefined polarization onto the polarization conversion element, or the second dispersive element may be operative to collect the dispersed wavelength components of the light after passage through the polarization conversion element.

The predetermined plane may preferably be generally parallel or perpendicular to the direction of generally linear polarization of the light. In addition, the control signal applied to the pixel may preferably be such as to rotate the direction of the polarization of light passing through the pixel through essentially 90°.

Furthermore, according to further preferred embodiments of the present invention, the polarization transformation device is such that the polarization direction of the at least one output beam of generally linearly polarized light is independent of the polarization of the input optical beam.

In accordance with still another preferred embodiment of the present invention, the beam expanding device and the beam compressing device may be a pair of anamorphic prisms, or a single prism, or a cylindrical lens telescope. In addition, the wavelength selective optical switch may also comprise at least one of a first linear polarizing element disposed in the optical path before the polarization conversion element, and a second linear polarizing element disposed in the optical path after the polarization conversion element.

There is further provided in accordance with still another preferred embodiment of the present invention, a wavelength selective switch module comprising a plurality of wavelength selective switches as described hereinabove, and wherein at least two of the wavelength dependent switches utilize a common one of at least one of a dispersive element, a focusing element and a polarization rotating element.

In accordance with a further preferred embodiment of the present invention, there is also provided a wavelength selective optical switch comprising:

(a) a polarization transformation device receiving input light having a plurality of wavelength components and outputting light of a predefined polarization, (b) a beam expanding device for expanding the light of predefined polarization in a predetermined plane, (c) a dispersive element receiving the expanded light of predefined polarization, and dispersing wavelength components of the expanded light of predefined polarization in the predetermined plane, (d) a polarization conversion element receiving the dispersed wavelength components of the expanded light of predefined polarization, the polarization conversion element being pixelated generally along the direction of the dispersion such that separate pixels are associated with separate wavelength components of the expanded light, and at least one pixel of the polarization conversion element being operative to convert the polarization of light passing through the pixel according to a control signal applied to the pixel, and (e) a reflective surface disposed in proximity to the polarization conversion element and on the distal side of the polarization conversion element relative to that on which the light passing through the pixel is incident, such that the light is reflected back through the pixel of the polarization conversion element.

In the above described reflective switch, the predefined polarization may preferably be either generally circular polarization or generally linear polarization. If the polarization is a generally linear polarization, then the control signal applied to the pixel may preferably be such that the polarization of the light of the wavelength component is rotated through essentially 90° after returning through the pixel. Furthermore, the light returning through the pixel is preferably directed back through the polarization transformation device for outputting from the switch.

There is also provided in accordance with yet a further preferred embodiment of the present invention, a wavelength selective optical switch as described above, and wherein the input optical beam is obtained from an input fiber, and the light returning through the pixel for outputting from the switch is directed into an output fiber, and wherein the switch also comprises a circulator to separate light in the output fiber from light in the input fiber.

Alternatively and preferably, the wavelength selective optical switch also preferably comprises a linear polarizer having an extinction ratio disposed between the polarization conversion element and the reflective surface, the linear polarizer having its direction of polarization essentially parallel to that of the light of generally linear polarization, and wherein the control signal applied to the pixel is such as to rotate the direction of the polarization of light of the wavelength component passing through the pixel through essentially 90°, such that the light of the wavelength component transmitted onwards through the linear polarizer is generally attenuated by the extinction ratio. Furthermore, light of the wavelength component reflected from the reflective surface may be attenuated generally by the extinction ratio also in returning through the linear polarizer, such that the attenuation of the light of the wavelength component is generally proportional to the square of the extinction ratio of the linear polarizer.

There is even further provided in accordance with a preferred embodiment of the present invention, a wavelength selective optical switch comprising:

(a) a dual fiber collimator inputting a fiber optical signal having a plurality of wavelength components, and outputting light having a plurality of wavelength components, (b) a first polarization transformation device receiving the light output from the dual fiber collimator, and outputting light of a predefined polarization, (c) a beam expanding device for expanding the light of predefined polarization in a predetermined plane, (d) a dispersive element receiving the expanded light of predefined polarization, and dispersing wavelength components of the expanded light of predefined polarization in the predetermined plane, (e) a polarization conversion element receiving the dispersed wavelength components of the expanded light of predefined polarization, the polarization conversion element being pixelated generally along the direction of the dispersion such that separate pixels are associated with separate wavelength components of the expanded light, and at least one pixel of the polarization conversion element being operative to convert the polarization of light passing through the pixel according to a control signal applied to the pixel, (f) at least two reflective surfaces disposed relative to the polarization conversion element, such that the wavelength components of the light of generally linear polarization are directed back through the beam expansion device and the dispersive element, the dispersive element combining the separate wavelength components of the output light into multi-wavelength output light, and (g) a second polarization transformation device aligned such that that part of the multi-wavelength output light having the predetermined polarization is transmitted therethrough and is output from the switch through the dual beam collimator.

In the above described wavelength selective optical switch the predefined polarization may be generally circular polarization, or generally linear polarization. In the latter case, the control signal applied to the pixel may preferably be such as to rotate the direction of the polarization of light passing through the pixel through essentially 90°.

Either of the above-described wavelength selective optical switches having a dual fiber collimator construction may also comprise a beam deviating element operative to receive an optical beam output from the dual fiber collimator, and to direct the beam into the first polarization transformation device, and to receive the output light from the second polarization transformation device, and to direct it into the dual fiber collimator.

BRIEF DESCRIPTION OF THE DRAWINGS

The present invention will be understood and appreciated more fully from the following detailed description, taken in conjunction with the drawings in which:

FIG. 4A is a schematic illustration of the anamorphic prism pair of the preferred embodiment shown in FIG. 1, and FIG. 4B shows a cylindrical lens telescope for preferably performing the beam expansion;

DETAILED DESCRIPTION OF PREFERRED EMBODIMENTS

Figure 1:
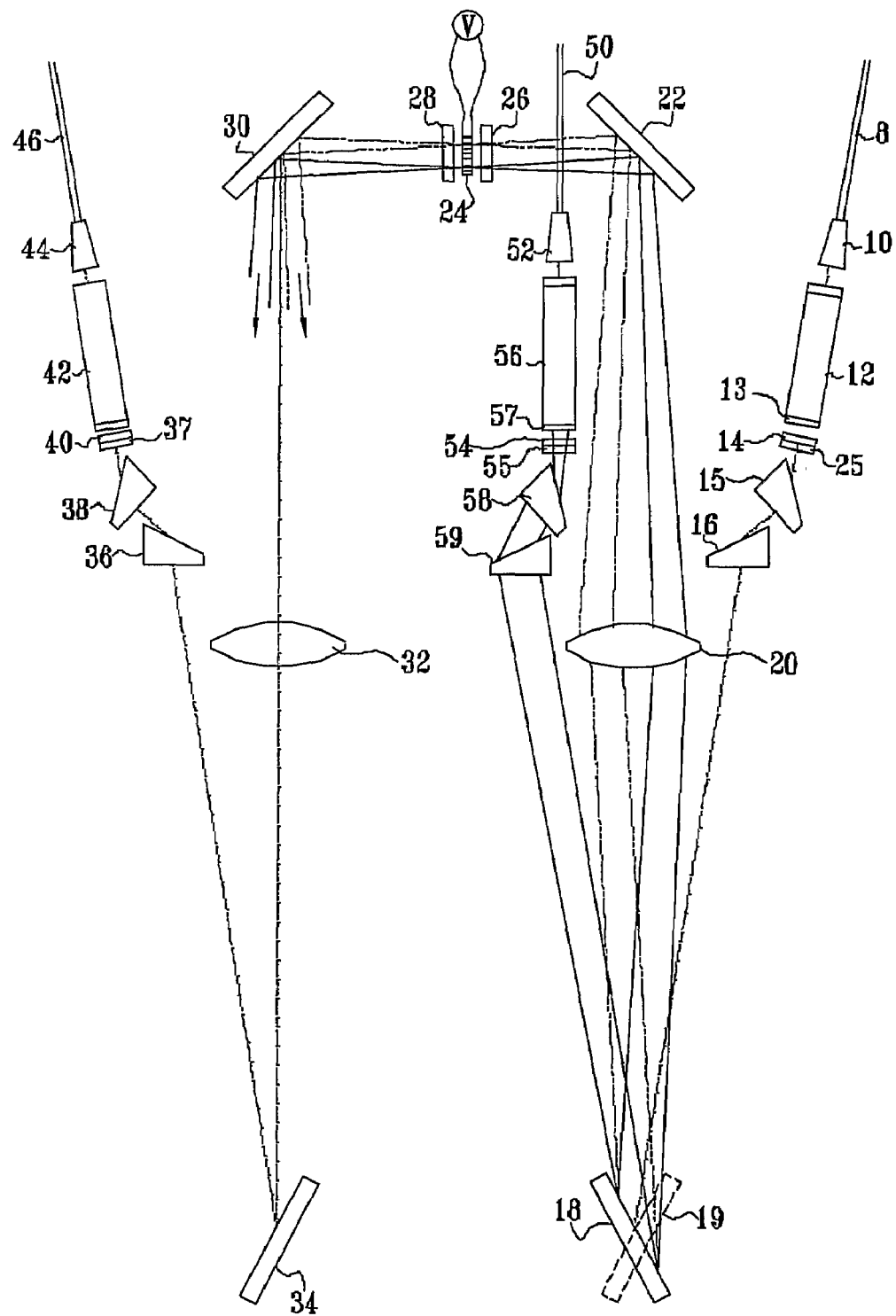
FIG. 1 schematically illustrates a single-pole, wavelength selective optical switch, constructed and operative according to a preferred embodiment of the present invention.

Reference is now made to FIG. 1, which illustrates schematically a fiber optical, single-pole, wavelength selective optical switch structure, constructed and operative according to a preferred embodiment of the present invention. Such a switch is known as a 1×1 switch, since it can switch a single input channel to a single output channel. The shown preferred switch structure can also be operative as a wavelength selective variable optical attenuator. Since the switch structure is wavelength selective, it can switch or attenuate preselected desired wavelengths, such that it can operate as a variable channel blocker or attenuator in an optical information switching or routing network.

The preferred embodiment shown in FIG. 1 is first described using essentially linearly polarized light in its switching or attenuating operative sections. The signal to be switched or attenuated is input through an input fiber 8 to a collimator 10, and from there, preferably to a C-polarizer 12, such as is commercially available from JDSU-Casix Corp., of Fuzhou, China. The C-polarizer preferably comprises a birefringent crystal such as $YVO_4$, which is operative to split the input signal into its two orthogonal S- and P-polarization components. A half wave plate disposed on the relevant half of the crystal's output port rotates the P-polarization component, such that both beams exiting the C-polarizer have the same polarization direction, namely S-polarization, which, for the purposes of the description of this preferred embodiment, is defined as being in the plane of the drawing. The result is the generation of two spatially-displaced, S-polarized components of the input signal, independent of the instantaneous direction of polarization of the light at the point of entry into the switch. This result is important since the polarization direction of an optical signal after transmission down a fiber is generally unknown. The ratio of the intensities of the two spatially-displaced S-polarized components will, however, be dependent on the entry polarization direction, but this dependency is generally unimportant, since the switch of the present invention operates by utilizing the sum of both of the components, and not the individual component beams separately.

The extinction ratio of the C-polarizer 12 is generally of the order of 30 dB. In order to increase the extinction ratio, a linear polarizer 14, such as a Polarcor™ element available from Corning Inc., of Corning, N.Y., USA, can be optionally disposed at the output of the C-polarizer, aligned parallel to the S-polarization direction of the light exiting the C-polarizer, to reduce even further the non-preferred P-polarization component. As will be seen hereinbelow from the description of the mode of operation of the switch, the higher the extinction ratio, the higher the on/off ratio attained by the switch.

The S-polarized light beams are now expanded in the direction parallel to the plane of the drawing, but preferably not significantly in the direction perpendicular to the plane of the drawing, by means of a laterally magnifying beam expander. Most preferably, an anamorphic prism pair 15, 16 is utilized. The magnification of the prism pair is primarily determined by the mutual angular position of the prisms, while the separation between the prisms defines the lateral shift of the beam. The preferred use of an anamorphic prism pair to achieve magnification in one direction, rather than, for instance, a cylindrical lens telescope or a single prism is advantageous when price and ease of alignment considerations are taken into account. A single prism embodiment has the disadvantage that it results in an output beam which is not parallel to the input beam and with a relatively low magnification. In comparison with the cylindrical lens solution, to be described hereinbelow, the two prism solution is advantageous since the incident angle on such a prism pair can be made close to the Brewster angle, at which the P-polarization component transmits through the prism pair with much lower efficiency than it would through a cylindrical lens telescope. This thus improves the overall system blocking effect compared to a system using a cylindrical lens.

The broadened beams are then directed to a grating 18, which is operative to disperse the light beams in the plane of the drawing into its separate wavelength components. The use of beams broadened in the direction perpendicular to that of the direction of the grating rulings enables the attainment of a higher resolving power, and thus increases the sharpness of the wavelength resolution of the switch, allowing it to work with denser DWDM systems, such as those with 50 GHz channel spacing and closer. The grating is preferably operated in an order selected to have both maximum efficiency and the required level of dispersion, whether a low order simple grating, or a higher order echelle grating. The grating is aligned such that the range of dispersed wavelengths to be switched are diffracted back through an imaging lens 20. The grating is preferably selected to have a high diffraction efficiency for the S-polarization direction, and a low efficiency for the P-polarization component, such that the extinction ratio of the module is increased yet further, though it is to be understood that the switch would also operate with a polarization independent grating.

Alternatively and preferably, a grating with high efficiency for the P-polarization can also be used. In this case, it would be advantageous to use a cylindrical lens telescope for the lateral beam expansion, as described and illustrated hereinbelow in connection with FIG. 4B, and not an anamorphic prism pair, since the P-polarization transmits with higher efficiency through the cylindrical lens than through the anamorphic prism pair, for the reason stated hereinabove.

Alternatively and preferably, the grating can be rotated to position 19, in which it operates in a negative order mode. In this case, the input module comprising the input fiber 50, a collimator 52, a C-polarizer 56, a linear polarizer 54 and a pair of anamorphic prisms 58, 59, can be located inboard of the optical axis between the grating 19 and the imaging lens 20, thereby reducing the lateral width of the complete switch module. In FIG. 1, the paths of the light beams from this inboard input module are shown in a schematic expanded state, while for the outboard input module, from input fiber 8, only the optical axis is drawn, to maintain clarity in the drawing.

In FIG. 1 are depicted two dispersed beams from grating 18 or 19, to represent two of the generally many wavelength components of the input light signal. One dispersed wavelength is shown as a dashed line, and the other as a full line. The dispersed beams are focused by the lens 20, onto the plane of a polarization rotation device 24, preferably a liquid crystal cell. The device is pixelated in the direction of the wavelength dispersion, such that different dispersed wavelengths fall on each of the different pixels of the device, as shown in FIG. 1. When a first appropriate drive voltage, V, is applied to a pixel, preferably by means of transparent electrodes coated on the faces of the device, as is known in the art, the polarization of light passing through that pixel is rotated, preferably through 90°, from S- to P-polarization, the effect of which will be explained hereinbelow. When a second appropriate voltage is applied to that pixel, light passes through with its S-polarization unchanged.

After passage through the liquid crystal cell 24, the polarization-modulated beams pass through the output side of the switch module, which preferably has elements complementary to those on the input side. The output side of the module thus preferably comprises a folding mirror 30, a complementary imaging lens 32, preferably spaced at a distance $2f$ from the input focusing lens 20, as is known in the art to provide optimum optical transfer characteristics to the imaging lens pair 20, 32, a diffraction grating 34 operative to receive and recombine dispersed light of the desired wavelengths, an anamorphic prism pair 36, 38, operative to collimate the laterally expanded beams into a pair of collimated essentially symmetrical beams, a C-polarizer 42 at one of its input ports receiving this pair of collimated beams and outputting a single combined beam, and a collimator 44 feeding this single output beam into the output fiber 46. As on the input side, the output fiber and its associated components can be disposed inboard of the line joining the diffraction grating 34 to the collimating lens 32, by using the minus one order of diffraction of the output grating 34, or another negative order. Generally, in order to maintain the symmetry of the module, both the input and the output gratings are preferably operated at the same order. The grating-to-grating distance is preferably 4 f, to provide optimal optical transfer efficiency, as is known in the art. In order to increase the extinction ratio even more, a linear polarizer 40, aligned with its polarization direction parallel to the plane of the drawing can be disposed before the output C-polarizer 42, such that light of a wavelength having a P-polarization direction is blocked from being transmitted through the polarizer.

The attenuation of the switch in the OFF state is determined by the overall extinction ratio (ER) between the two perpendicular S- and P-polarizations. This overall extinction ratio results from the combination of the C-polarizer ER, the grating ER, the prism ER and module alignments. Light of wavelengths whose polarization was not rotated in the liquid crystal cell, passes through the optional linear polarizer 40 and the output C-polarizer 42 virtually unattenuated, and the switch thus remains in its ON state for that particular wavelength. The only reduction in the transmitted signal then arises from the switch's insertion loss. The drive circuits of the pixels of the liquid crystal element can thus be programmed by the communication or information control system, in order to pass or block different wavelengths at different instants in time, according to the operational requirements of the system.

Besides the linear polarizers 14, 40 located close to the outputs of the C-polarizers 12, 42, additional linear polarizers 26, 28 can be preferably disposed on either side of the liquid crystal cell 24 to increase the extinction ratio even more.

If the liquid crystal cell is of the commonly used nematic crystal type and the rubbing direction is at 45° to the polarization direction of the light traversing it, then when the voltage across a pixel is set for maximum attenuation (i.e. blocking), the phase difference undergone by the light during passage through the pixel is $\pi$, whereas when the drive voltage is maximum, a phase change of $2\pi$, arising from the natural birefringence of the cell is engendered and the insertion loss is minimal. Any alternative type of liquid crystal element known in the art may also be preferably used, the primary requirement being the ability to generate polarization changes in the light which can then be analyzed at the output side of the switch structure to provide overall transmission or blocking functions.

In order to decrease the package footprint, in passage between the focusing lens 20 and the polarization rotation cell 24, the beam is preferably folded by means of the reflector mirror 22, and likewise by mirror 30 on the output path side of the cell 24. Other folding mirrors can also be used elsewhere in the module where appropriate, in order to decrease the module size even more.

When the switch structure shown in the preferred embodiment of FIG. 1 is to be used as an attenuator, the drive voltages V applied to the various pixels of the polarization rotation device 24, are arranged to provide other than 90° polarization rotation, such that the desired level of attenuation of the optical signal which traverses that pixel is obtained at the output, as explained hereinabove.

Furthermore, when the linear polarizer elements 14 and 40 (or 54 and 40) are preferably replaced by quarter wave plates, the light is converted into a circularly polarized beam, and the switch or attenuator structure of FIG. 1 is operable by changing the direction of rotation of the circular polarization of the light passing through each pixel of the liquid crystal device 24, as expounded hereinabove. Alternatively and preferably, additional quarter wave plates 25, 37 (or 55, 37), are added respectively after and before the above mentioned linear polarizers 14, 40, resulting in a more perfect circular polarization output, since the input to the quarter wave plates are more completely linearly polarized. In such embodiments, linear polarizers 26, 28 would not be necessary.

Figure 2A:
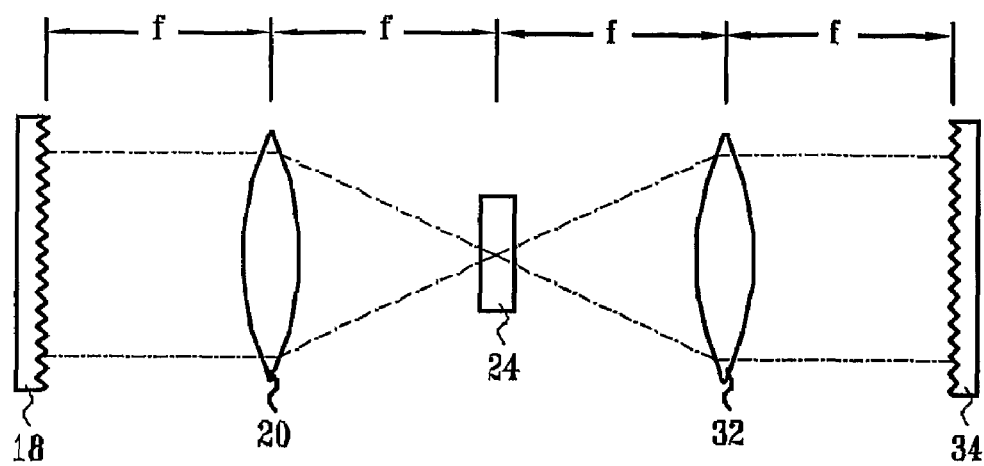
FIGS. 2A and 2B are schematic side sectional views of the optical path of the dispersed beam through part of the preferred embodiment shown in FIG. 1, showing alternative and preferred focusing arrangements for the switch.

Reference is now made to FIG. 2A, which is a schematic side sectional view of the plane perpendicular to the direction of dispersion of the optical path of the dispersed beam between the dispersing grating 18 and the collecting grating 34 of the preferred embodiment shown in FIG. 1, illustrating the way in which the light is focused onto and imaged from the liquid crystal element 24 by means of a pair of lenses 20, 32, each preferably spaced a distance f, the focal length of each lens, from the liquid crystal element. The components have the same reference characters to those used in FIG. 1. The distance between the two gratings is preferably designed to be 4f, as previously mentioned.

Figure 2B:
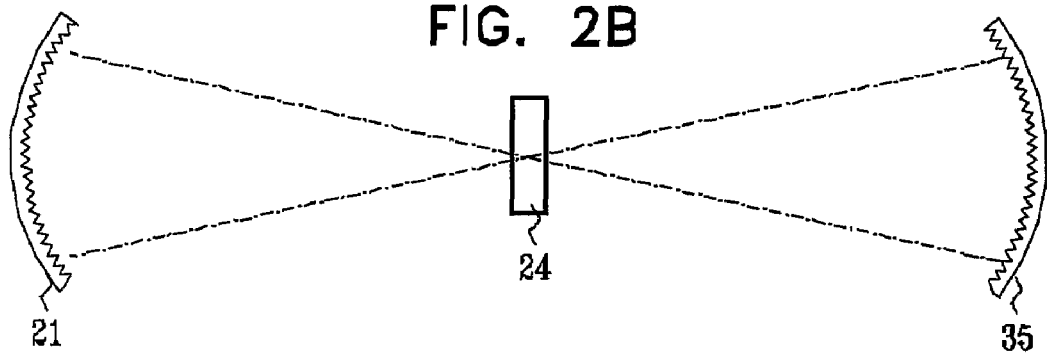

Alternatively and preferably to the use of lenses to perform the focussing of the wavelength components of the dispersed light onto the polarization rotation element and the imaging of the light therefrom, concave gratings can be used for one or both of these functions. Reference is now made to FIG. 2B, which is a view of the plane perpendicular to the direction of dispersion, illustrating such an embodiment. The concave dispersive grating 21 disperses and focuses the incident expanded light onto the plane of the liquid crystal element 24, and the concave dispersive grating 35 collects the diverging wavelength components of the light after passage through the liquid crystal element 24, and preferably collimates the resulting multiple wavelength beam towards the beam compressor. According to even further preferred embodiments, either one of these functions can be performed by a lens, and the other by use of a concave grating.

Figure 3:
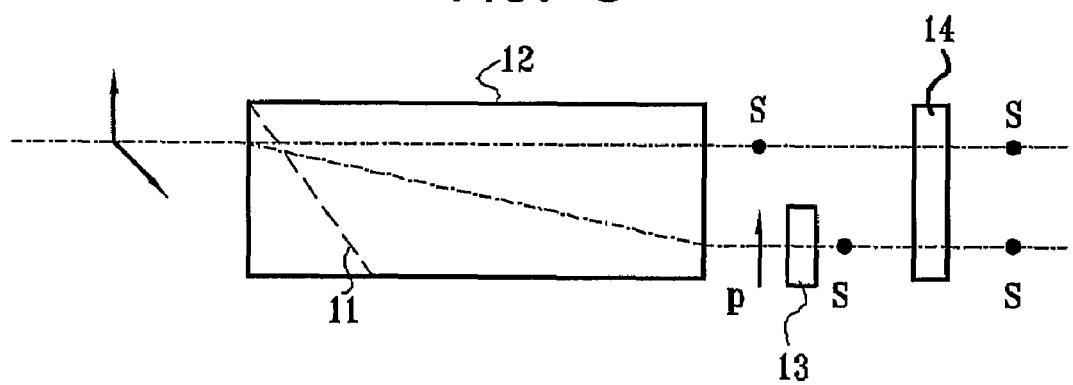
FIG. 3 a schematic illustration of the C-polarizer section of the preferred embodiment shown in FIG. 1.

Reference is now made to FIG. 3, which is a schematic illustration of the C-polarizer 12 of the preferred embodiment shown in FIG. 1. The C-polarizer preferably comprises a birefringent crystal such as $YVO_4$ with a half wave plate 13 on the P-polarization side of the output port. An optional linear polarizer 14, incorporated to improve the extinction ratio, and aligned parallel to the S-polarization direction, is disposed in both parts of the output beam. The separate P- and S-polarization components are marked on the two output beams shown in the drawing.

Figure 4A:
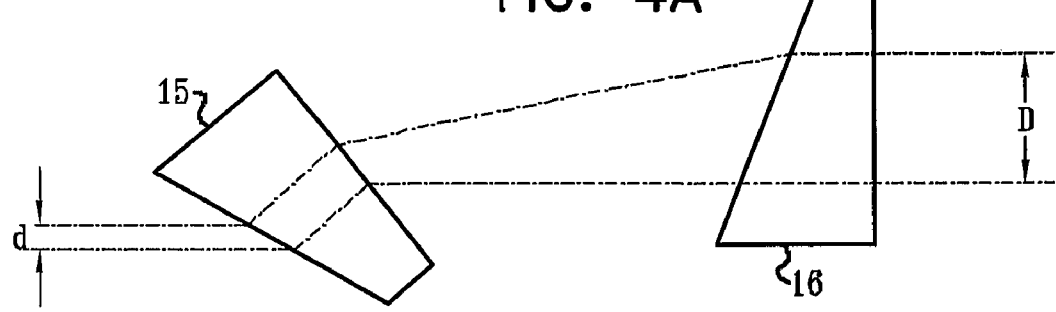
FIGS. 4A and 4B are schematic illustrations of alternative preferred methods of generating the desired beam expansion for the switch of the present invention.

Reference is now made to FIG. 4A, which is a schematic illustration of the anamorphic prism pair 15, 16, of the preferred embodiment shown in FIG. 1, illustrating how the narrow beams of overall dimension d from the C-polarizer are laterally expanded essentially in one direction only to an overall dimension D. The magnification can preferably be set between ×2 and ×6, or even more, as a function of the prism apex angle, the prism material and the mutual angle between the prisms. The separation between the prisms defines the optical axis shift between the input and output beams. The two beams are preferably made parallel to each other.

Figure 4B:
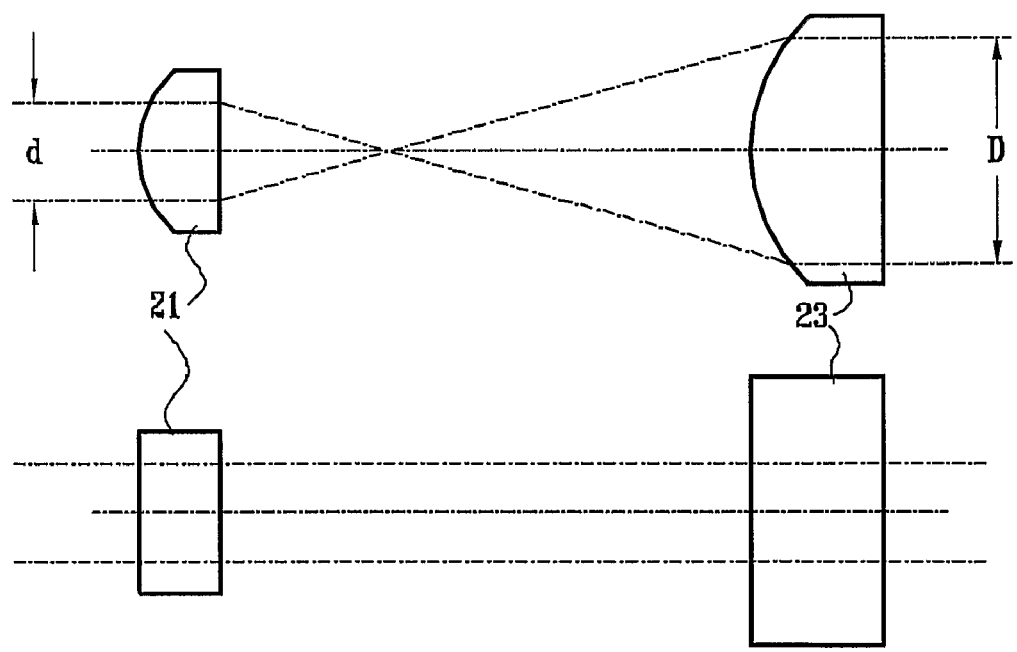

Reference is now made to FIG. 4B, which is a schematic illustration of an alternative and preferred method of lateral beam expansion, for use in the embodiment of FIG. 1, using a cylindrical lens telescope system, comprising cylindrical lenses 21 and 23. The narrow beams of overall dimension d from the C-polarizer are laterally expanded essentially in one direction only to an overall dimension D, as shown in the top part of FIG. 4B, while in the perpendicular direction, as shown in the bottom part of FIG. 4B, no expansion is generated.

Figure 5:
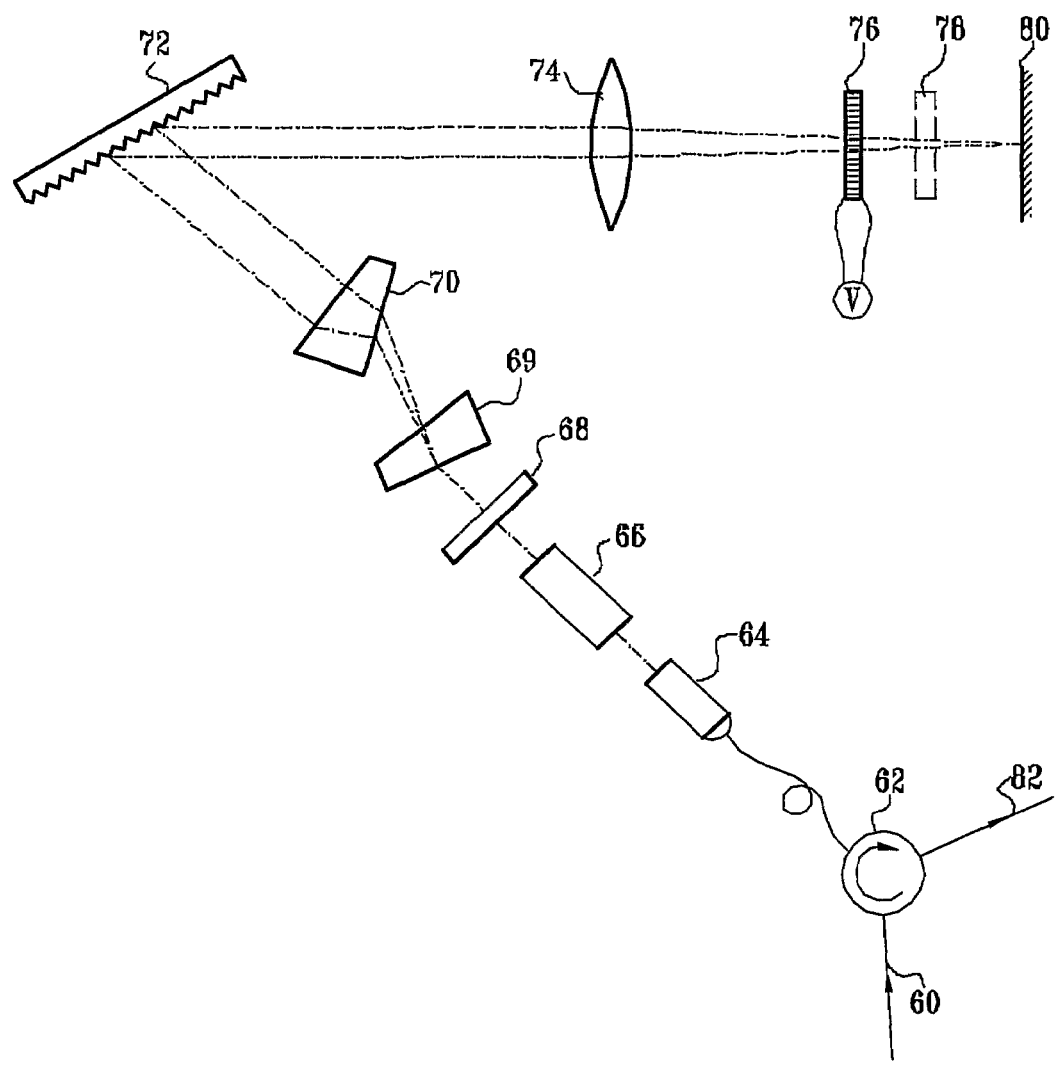
FIG. 5 is a schematic illustration of a reflective embodiment of the switch according to a further preferred embodiment to the present invention, using a circulator to separate input and output signals.

Reference is now made to FIG. 5, which is a schematic illustration of a wavelength selective switch, constructed and operative according to a further preferred embodiment of the present invention. This preferred embodiment differs from that shown in FIG. 1 in that it is a reflective embodiment, in which common components are used for equivalent but reversed or mirror imaged functions on the input and output sides of the switch. In this way, the number of components required to construct the switch is reduced almost to half that of the transmission embodiment shown in FIG. 1. However, an additional component is required at the "input" end of the switch in order to separate the true input signal from the switched output signal.

In FIG. 5, the input signal 60 is preferably applied through a circulator 62, a collimator 64, a C-polarizer 66 to provide output beams of the same polarization, preferably the S-polarization, an optional linear polarizer 68 aligned parallel to the S-polarization direction, and a pair of anamorphic prisms 69, 70. The beams, laterally expanded by the prism pair in the direction of the plane of the drawing, impinge the grating 72, and the wavelength-dispersed light is directed towards the focusing lens 74, which focuses it through the polarization rotation element 76, preferably a pixelated liquid crystal cell. As described hereinabove in relation to the embodiment of FIG. 2B, in place of a focussing lens 74, the grating 72 can be a concave grating such that it performs both the dispersive and the focussing functions required by the reflective embodiment of FIG. 5. The liquid crystal element is chosen to be such that when the appropriate switching voltage is applied to a specific pixel, the liquid crystal cell at that pixel behaves as a quarter wave plate, transforming the linear polarization of the light passing through the pixel to circular polarization. Application of a second and alternate predetermined voltage results in no polarization change. After passage through the liquid crystal cell, the light impinges on a reflective surface 80 disposed in close proximity to the cell, and is reflected back through the cell. The reflector surface can be preferably made part of the cell by using a suitable coating on the rear surface of the cell. The effect of the reflection is to reverse the effective direction of the circular rotation in relation to the propagation direction of the beam, such that on its return path through the pixel, if the pixel is one which has the appropriate switching voltage applied, the circularly polarized light is converted back to linear polarization, but subject to a 90° polarization rotation, from the originally aligned S-polarization to P-polarization. If the pixel has the alternative applied voltage, its state is such that the polarization is unchanged.

The light then continues, returning along the same path as its incident passage. The C-polarizer 66 this time acts as a blocker to the light of those wavelengths whose polarization was switched to P-polarization in the liquid crystal cell, but allows transmission of the light of those wavelengths with unchanged S-polarization. This transmitted light exits the switch at the circulator 62, from where it is directed to the output fiber 82. As previously, the optionally incorporated linear polarizer 68 is used to increase the extinction ratio of the switch.

In the above described embodiment, the liquid crystal cell is chosen to be such that it is operated as a quarter wave plate when activated, such that the polarization is rotated a total of 90°, and the blocking of the resulting 90° polarization-rotated optical signal after its return passage through the cell takes place at the C-polarizer 66 in conjunction with the optional linear polarizer 68, if installed. In this preferred embodiment, the OFF-attenuation level is dependent on the extinction ratio of the C-polarizer 66, together with that of the linear polarizer 68, if fitted.

Alternatively and preferably to the above described arrangement, the linear polarizer, item 78 shown in dotted lines in FIG. 5, can be positioned between the liquid crystal cell 76 and the reflective surface 80. In this case, the liquid crystal cell is chosen to be such that it is operated as a half wave plate when activated, such that the polarization is rotated 90° just from its forward passage through the cell, from an S-polarization to a P-polarization. The linear polarizer, now in position 78, is aligned parallel to the S-polarization direction, such that it attenuates such a progressing forward beam which has passed through an activated pixel, by its extinction ratio. After reflection from the mirror, the returning P-polarized beam again passes through the polarizer 78, where its intensity is again reduced by the extinction ratio, such that the total attenuation is dependent on the square of the extinction ratio of the polarizer 78. The ON/OFF ratio of this preferred embodiment is thus significantly better than that of the embodiment with the linear polarizer 68 located at the output of the C-polarizer 66, or without any linear polarizer at all. This greatly attenuated beam again traverses the "half wave plate" activated liquid crystal cell 76, where its polarization is again rotated back to the S-direction, and is returned through the chain of components and out through the exit fiber 82. When the voltage across a particular pixel is such as to leave the polarization direction of the light transmitted therethrough unchanged, then the light retains its S-polarization in its return trip through the switch up to the C-polarizer 66, and eventually exits the switch through fiber 82 attenuated only by the insertion loss of the switch.

Figure 6:
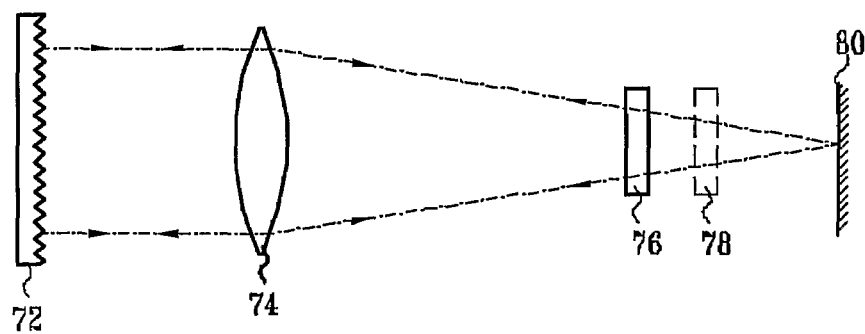
FIG. 6 is a schematic side sectional view of the optical path of the dispersed beam through part of the preferred reflective switch embodiment shown in FIG. 5.

Reference is now made to FIG. 6 which is a schematic side sectional view of the optical path of the dispersed beam between the dispersing grating 72 and the reflective surface 80 of the preferred embodiments of FIG. 5. In the case of the reflective embodiments, the light is focused through the liquid crystal element 76, and the linear polarizer 78 if present, onto the reflective surface 80 by means of a single lens 74, preferably spaced a distance f from the reflective surface to provide optimum optical performance, where f is the focal length of the lens. The components have the same reference characters to those used in FIG. 5.

Figure 7:
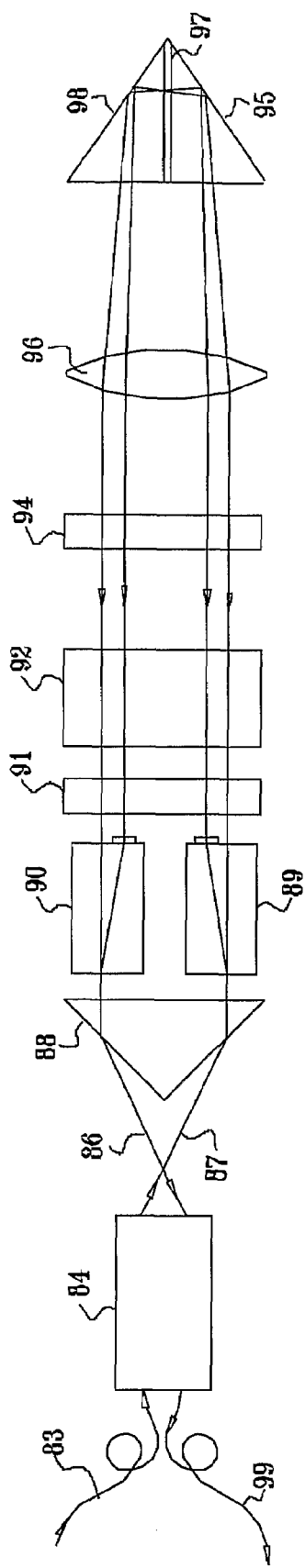
FIG. 7 is a schematic illustration of an alternative embodiment of the switch configuration of FIGS. 1 and 5, of particularly compact construction, according to another preferred embodiment of the present invention.

Reference is now made to FIG. 7 which is a schematic illustration of another preferred embodiment of the switch configuration of the present invention, viewed in the plane perpendicular to the plane of dispersion. In FIG. 7, in order to avoid lack of clarity in the drawing, the various beams of light are depicted only by their center lines. This embodiment differs from that shown in FIG. 5 in that a dual fiber collimator 84 is used to separate the input signal fiber 83 from the output signal fiber 99. Alternatively and preferably, separation of the input and output signals can be performed using two single fiber collimators aligned at a small mutual angle to each other. The output beam 87 from the dual fiber collimator 84 is preferably input to a beam bending device, such as a roof prism 88 as preferably shown in the embodiment of FIG. 7. This prism is operative to refract the beam 87 in order to correct its deviation from the optical axis of the system on exit from the dual fiber collimator. This deviation is purposely exaggerated in FIG. 7 to illustrate the operation of the roof prism 88. The input beam then preferably enters a C-polarizer 89, such that both of the output beams have S-polarization direction. The light then passes through an optional linear polarizer 91, aligned to transmit light of S-polarization, and thereby to increase the extinction ratio of the switch, and is then laterally expanded, preferably by means of an anamorphic prism pair 92. Since the lateral expansion direction is perpendicular to the plane of the drawing, it is not apparent in FIG. 7. The expanded beam of light is then wavelength dispersed, also in the direction perpendicular to the plane of the paper, preferably by means of the grating 94, and is focused by imaging lens 96 onto a face of a 45° isosceles right prism. The hypotenuse face of the prism, or the mirror, reflects the light onto a pixelated liquid crystal 97, whose pixelated axis extends perpendicular to the plane of the drawing. Alternatively and preferably, reflection can be achieved using mirrors aligned at 45 deg. to the beam. The lens is arranged such that the light is focussed onto the plane of the pixels, different wavelengths falling on different pixels of the element. The pixels are controlled to either rotate or not to rotate the polarization of the light passing through each pixel, from S- to P-polarization, according to whether the wavelength passing through the particular pixel is to be blocked or transmitted.

After passage through the pixelated liquid crystal, the light preferably enters another 45° isosceles right prism (or a mirror inclined at 45 deg), is totally internally reflected from its hypotenuse face, and is imaged by the lens 96 back into the grating 94, where the dispersed wavelength components are recombined. The expanded beams are then compressed by the anamorphic prism pair 92, and encounter the optional linear polarizer 91, which is operative to block light with rotated P-polarization, or to transmit light with its original unrotated S-polarization. The beams transmitted, having S-polarization, are then recombined in another C-polarizer 90, and directed through the roof prism 88 to the second port 86 of the dual fiber collimator 84, from where the transmitted signals are exited through output fiber 99. Though in the embodiment shown in FIG. 7, single components are used to respectively perform the functions of the optional linear polarizer 91, the beam expansion 92, beam dispersion 94 and beam focussing 96, for both the incident and the output sides of the liquid crystal element, it is to be understood that separate input and output components can equally well be preferably used on the input and output sides.

It is to be understood that the various embodiments shown in FIGS. 1, 5 and 7, whether transmissive or reflective, can also be operative as a wavelength selective attenuator, by use of the appropriate drive voltages to the pixels of the liquid crystal element, or can be operative using circularly polarized light instead of linearly polarized light.

Figure 8:
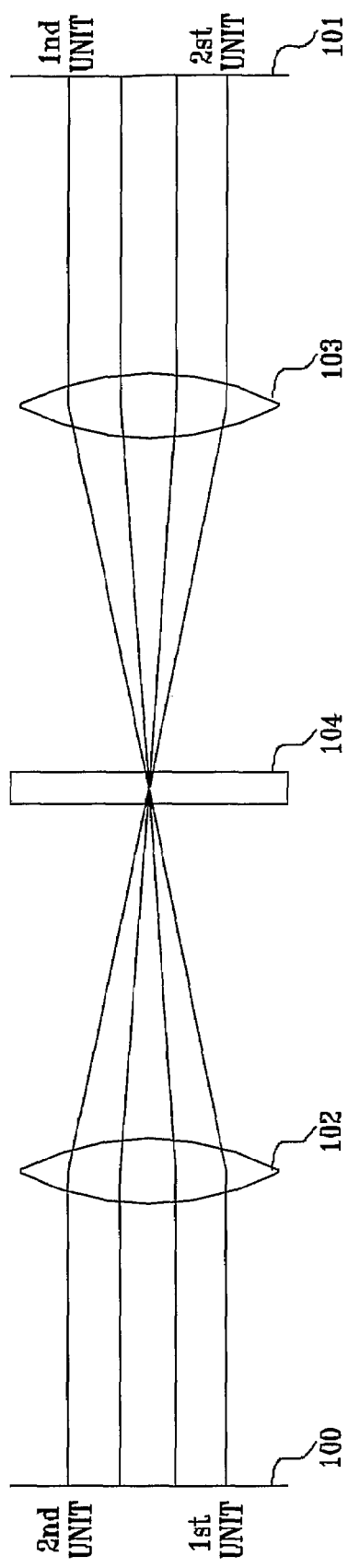
FIG. 8 is a schematic illustration of a multiple channel wavelength selective switch module, according to yet another preferred embodiment of the present invention, comprising a pair of 1×1 switches stacked one on top of the other in a single package, and utilizing common gratings, lenses and liquid crystal cells.

Reference is now made to FIG. 8 which is a schematic illustration of a multiple channel wavelength selective switch module, according to yet another preferred embodiment of the present invention. The embodiment is similar to that whose optically active section is shown schematically in FIG. 2, except that in the embodiment of FIG. 8, a pair of 1×1 switches are stacked one on top of the other, and preferably utilize common depressive elements 100, 101, common focusing lenses, 102, 103 and a common liquid crystal cell 104. Application of the appropriate control voltage to the liquid crystal cell switches both channels simultaneously. By sharing of these common components, such an embodiment enables a more compact and component economic device to be constructed in a single package.

Figure 9:
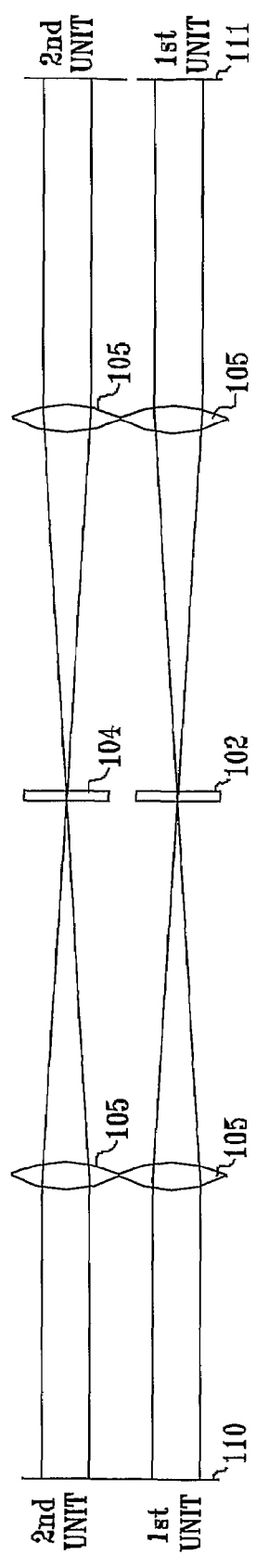
FIG. 9 is a schematic illustration of another multiple channel wavelength selective switch module, similar to that of FIG. 8, but utilizing only common gratings.

Reference is now made to FIG. 9 which is a schematic illustration of a multiple channel wavelength selective switch module, according to yet another preferred embodiment of the present invention. This embodiment differs from that of FIG. 8 in that only the dispersion gratings 110, 111, are common to the two channels transmitted through the switch, while the liquid crystal cells 102, 104 and their associated focusing lenses 105 are independent. By this means, each channel, though operative at the same wavelength because of the use of common diffraction gratings, can be blocked independently.

Though the multiple unit embodiments shown in FIGS. 8 and 9 are shown as transmissive switch embodiments, it is to be understood that the same package sharing techniques can also be applied to the reflective embodiment shown in FIG. 5. Likewise, although only a pair of switches are shown in each of the modules of FIGS. 8 and 9, it is to be understood that the same package sharing techniques can also be applied for more than two switches in each module. Further examples of such switch stacking techniques, to provide multiply parallel, wavelength selective switches, useful for providing switching or blocking capability with channel redundancy, as is known in the art, are described in the above-mentioned PCT Application, No. PCT IL02/00511, hereby incorporated by reference in its entirety.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A wavelength selective optical switch comprising:
a polarization transformation device receiving input light having a plurality of wavelength components and outputting' light of a predefined polarization;
a beam expanding device for expanding said light of predefined polarization in a predetermined plane;
a first dispersive element receiving said expanded light of predefined polarization, and dispersing wavelength components of said expanded light of predefined polarization in said predetermined plane;
a polarization conversion element receiving said dispersed wavelength components of said expanded light of predefined polarization, said polarization conversion element being pixelated generally along the direction of said dispersion such that separate pixels are associated with separate wavelength components of said expanded light, and at least one pixel of said polarization conversion element being operative to convert the polarization of light, passing through said pixel according to a control signal applied to said pixel;
a second dispersive element receiving light from said polarization conversion element, and operative to combine said separate wavelength components of said light into multi-wavelength output light;
a beam compressing device aligned such that said multi-wavelength output light is compressed in said predetermined plane; and
a polarization selective device receiving said compressed multi-wavelength output light, said polarization selective device being aligned such that only those components of said multi-wavelength output light having a predetermined polarization are transmitted therethrough.

2. A wavelength selective optical switch according to claim 1 and wherein said predefined polarization is a generally linear polarization.

3. A wavelength selective optical switch according to claim 1 and further comprising at least one of a first focusing element to focus said dispersed wavelength components of said expanded light of predefined polarization onto said polarization conversion element, and a second focusing element to collect said dispersed wavelength components of said light after passage through said polarization conversion element.

4. A wavelength selective optical switch according to claim 1 and wherein said first dispersive element is operative to focus said dispersed wavelength components of said expanded light of predefined polarization onto said polarization conversion element, and said second dispersive element is operative to collect said dispersed wavelength components of said light after passage through said polarization conversion element.

5. A wavelength selective optical switch according to claim 2 and wherein said predetermined plane is generally parallel to the direction of said generally linear polarization of said light.

6. A wavelength selective optical switch according to claim 2, and wherein; said predetermined plane is generally perpendicular to the direction of generally linear polarization of said light.

7. A wavelength selective optical switch according to claim 2 and wherein said control signal applied to said pixel is such as to rotate the direction of polarization of light passing through said pixel through essentially 90°.

8. A wavelength selective optical switch according to claim 2 and wherein said polarization transformation device is a birefringent crystal having a half wave plate over part of its output.

9. A wavelength selective optical switch according to claim 2 and wherein said polarization transformation device is such that said polarization direction of said at least one output beam of generally linearly polarized light is independent of the polarization of said input optical beam.

10. A wavelength selective optical switch according to claim 8 and further comprising a linear polarizer at the output of said birefringent crystal having a half wave plate over part of its output.

11. A wavelength selective optical switch according to claim 1 and wherein at least one of said beam expanding device and said beam compressing device is selected from a group consisting of a pair of anamorphic prism, a single prism and a cylindrical lens.

12. A wavelength selective optical switch according to claim 1 and further comprising at least one of a first linear polarizing—element disposed in the optical path before said polarization conversion element, and a second linear polarizing element disposed in the optical path after said polarization conversion element.

13. A wavelength selective optical switch according to claim 1 and wherein said polarization conversion element is a liquid crystal cell.

14. A wavelength selective switch module comprising a plurality of wavelength selective switches according to claim 1, and wherein at least two of said wavelength dependent switches utilize a common one of at least one of a dispersive element, a focusing element and a polarization rotating element.

15. A wavelength selective optical switch comprising:
a polarization transformation device receiving input light having a plurality of wavelength components and outputting light of a predefined polarization;
a beam expanding device for expanding said light of predefined polarization in a predetermined plane;
a dispersive element receiving said expanded light of predefined polarization, and dispersing wavelength components of said expanded light of predefined polarization in said predetermined plane;
a polarization conversion element receiving said dispersed wavelength components of said expanded light of predefined polarization, said polarization conversion element being pixelated generally along the direction of said dispersion such that separate pixels are associated with separate wavelength components of said expanded light, and at least one pixel of said polarization conversion element being operative to convert the polarization of light passing through said pixel according to a control signal applied to said pixel; and
a reflective surface disposed in proximity to said polarization conversion element such that light is incident thereon after passing through said polarization conversion element, and is reflected back through said pixel of said polarization conversion element.

16. A wavelength selective optical switch according to claim 15 and wherein said predefined polarization is a generally linear polarization.

17. A wavelength selective optical switch according to claim 16 and wherein said control signal applied to said pixel is such that the polarization of said light of said wavelength component is rotated through essentially 90° after returning through said pixel.

18. A wavelength selective optical switch according to claim 15 and wherein said light returning through said pixel is directed back through said polarization transformation device for outputting from said switch.

19. A wavelength selective optical switch according to claim 15 and wherein said input optical beam is obtained from an input fiber, and said light returning through said pixel for outputting from said switch is directed into an output fiber, and wherein said switch further comprises a circulator to separate light in said output fiber from light in said input fiber.

20. A wavelength selective optical switch comprising:
a polarization transformation device receiving input light having a plurality of wavelength components and outputting light of a predefined polarization;
a beam expanding device for expanding said light of predefined polarization in a predetermined plane;
a dispersive element receiving said expanded light of predefined polarization, and dispersing wavelength components of said expanded light of predefined polarization in said predetermined plane;
a polarization conversion element receiving said dispersed wavelength components of said expanded light of predefined polarization, said polarization conversion element being pixelated generally along the direction of said dispersion such that separate pixels are associated with separate wavelength components of said expanded light, and at least one pixel of said polarization conversion element being operative to convert the polarization of light passing through said pixel according to a control signal applied to said pixel; and
a reflective surface disposed in proximity to said polarization conversion element such that light is incident thereon after passing through said polarization conversion element, and is reflected back through said pixel of said polarization conversion element, and wherein said predefined polarization is a generally linear polarization, and also comprising a linear polarizer having an extinction ratio disposed between said polarization conversion element and said reflective surface, said linear polarizer having its direction of polarization essentially parallel to that of said light of generally linear polarization, and wherein said control signal applied to said pixel is such as to rotate the direction of the polarization of light of said wavelength component passing through said pixel through essentially 90° such that said light of said wavelength component transmitted onwards through said linear polarizer is generally attenuated by said extinction ratio.

21. A wavelength selective optical switch according to claim 20 and wherein light of said wavelength component reflected from said reflective surface is attenuated generally by said extinction ratio also in returning through said linear polarizer, such that the attenuation of said light of said wavelength component is generally proportional to the square of the extinction ratio of said linear polarizer.

22. A wavelength selective optical switch comprising:

a dual fiber collimator inputting a fiber optical signal having a plurality of wavelength components, and outputting said signal as light having a plurality of wavelength components;

a first polarization transformation device receiving said light output from said dual fiber collimator, and outputting said light with a predefined polarization;

a beam expanding device for expanding said light of predefined polarization in a predetermined plane;

a dispersive element receiving said expanded light of predefined polarization, and dispersing wavelength components of said expanded light of predefined polarization in said predetermined plane;

a first reflecting surface directing said dispersed wavelength components of said expanded light of predefined polarization through a polarization conversion element, said polarization conversion element being pixelated generally along the direction of said dispersion such that separate pixels are associated with separate wavelength components of said expanded light, and at least one pixel of said polarization conversion element being operative to convert the polarization of light passing through said pixel according to a control signal applied to said pixel;

a second reflective surface disposed, such that said wavelength components of said light of generally linear polarization, after passage through said polarization conversion element, are directed back through said beam expansion device and said dispersive element, said dispersive element combining said separate wavelength components of said output light into multi-wavelength output light; and a second polarization transformation device aligned such that that part of said multi-wavelength output light having said predetermined polarization is transmitted therethrough and is output from said switch through said dual beam collimator.

23. A wavelength selective optical switch according to claim 22 and wherein said predefined polarization is a generally linear polarization.

24. A wavelength selective optical switch according to claim 23 and wherein said control signal applied to said pixel is such as to rotate the direction of the polarization of light passing through said pixel through essentially 90°.

* * * * *